United States Patent
Johnson et al.

(10) Patent No.: US 10,711,769 B2
(45) Date of Patent: Jul. 14, 2020

(54) ACTUATOR DEVICE BASED ON AN ELECTROACTIVE POLYMER

(71) Applicant: KONINKLIJKE PHILIPS N.V., Eindhoven (NL)

(72) Inventors: Mark Thomas Johnson, Arendonk (NL); David Andrew Fish, Worthing (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/336,580

(22) PCT Filed: Sep. 22, 2017

(86) PCT No.: PCT/EP2017/073972
§ 371 (c)(1),
(2) Date: Mar. 26, 2019

(87) PCT Pub. No.: WO2018/065232
PCT Pub. Date: Apr. 12, 2018

(65) Prior Publication Data
US 2019/0219039 A1      Jul. 18, 2019

(30) Foreign Application Priority Data
Oct. 4, 2016   (EP) ..................... 16192121

(51) Int. Cl.
*F03G 7/00*    (2006.01)
(52) U.S. Cl.
CPC .................... *F03G 7/005* (2013.01)
(58) Field of Classification Search
CPC ..................................... F03G 7/005
(Continued)

(56) References Cited

U.S. PATENT DOCUMENTS 7,196,688 B2 * 3/2007 Schena ............... G01D 7/007
345/156
9,231,473 B2    1/2016 Van Kessel
(Continued)

FOREIGN PATENT DOCUMENTS

CN     105789429 A    7/2016
EP       1693950 A1   8/2006
(Continued)

OTHER PUBLICATIONS

M. Bahrami-Samani "Dynamics of Conducting Polymer Actuators" 2007 Thesis, University of Wollongong.
(Continued)

*Primary Examiner* — David Luo
(74) *Attorney, Agent, or Firm* — Schott, P.C.

(57) ABSTRACT

An actuator device comprises an active matrix array of rows and columns of electroactive polymer actuators, each electroactive polymer actuator having a switching circuit. The switching circuit has a drive transistor and a capacitor arrangement. The capacitor arrangement is charged to a voltage derived from a drive voltage for the electroactive polymer actuator combined with a voltage derived from the drive transistor threshold voltage. During this programming of the capacitor arrangement, the EAP actuator is isolated from any current flowing. The switching circuit enables compensation for age-related changes in the threshold voltage. Thus, a low performance (i.e. with poor threshold voltage stability) transistor may be used, with measurement of the threshold voltage of the current-providing TFT once per frame time (or once per multiple frame times) to compensate for the aging effect.

18 Claims, 6 Drawing Sheets

(58) Field of Classification Search
USPC .................................................. 318/116, 34
See application file for complete search history.

(56) References Cited

U.S. PATENT DOCUMENTS

| | | |
|---|---|---|
| 2006/0077134 A1 | 4/2006 | Hector et al. |
| 2006/0266981 A1 | 11/2006 | Asaka et al. |
| 2008/0122589 A1 | 5/2008 | Ivanov |

FOREIGN PATENT DOCUMENTS

| | | |
|---|---|---|
| JP | 2014052586 A | 11/2004 |
| JP | 2006-518473 A | 8/2006 |
| WO | 2004/066249 A1 | 8/2004 |

OTHER PUBLICATIONS

"Room-temperature fabrication of transparent flexible thin-film transistors using amorphous oxide semiconductors" Nature 432: p. 488-492, Nov. 25, 2004.
R.M.A. Dawson et al—'Pursuit of Active Matrix LED Displays', 24.1 SID Digest 01, May 2001, p. 372.

* cited by examiner

ACTUATOR DEVICE BASED ON AN ELECTROACTIVE POLYMER

FIELD OF THE INVENTION

This invention relates to actuator devices which make use of electroactive polymers.

BACKGROUND OF THE INVENTION

Electroactive polymers (EAP) are an emerging class of materials within the field of electrically responsive materials. EAP's can work as sensors or actuators and can easily be manufactured into various shapes allowing easy integration into a large variety of systems.

Materials have been developed with characteristics such as actuation stress and strain which have improved significantly over the last ten years. Technology risks have been reduced to acceptable levels for product development so that EAP devices are commercially and technically becoming of increasing interest. Advantages of EAP devices include low power, small form factor, flexibility, noiseless operation, accuracy, the possibility of high resolution, fast response times, and cyclic actuation.

The improved performance and particular advantages of EAP material give rise to applicability to new applications.

An EAP device can be used in any application in which a small amount of movement of a component or feature is desired, based on electric actuation. Similarly, the technology can be used for sensing small movements.

The use of EAP devices enables functions which were not possible before, or offers a big advantage over common sensor/actuator solutions, due to the combination of a relatively large deformation and force in a small volume or thin form factor, compared to common actuators. EAP devices also give noiseless operation, accurate electronic control, fast response, and a large range of possible actuation frequencies, such as 0-20 kHz.

Devices using electroactive polymers can be subdivided into field-driven and ionic-driven materials.

Examples of field-driven EAP devices are dielectric elastomers, electrostrictive polymers (such as PVDF based relaxor polymers or polyurethanes) and liquid crystal elastomers (LCE).

Examples of ionic-driven EAP devices are conjugated polymers, carbon nanotube (CNT) polymer composites and Ionic Polymer Metal Composites (IPMC).

Field-driven EAP devices are actuated by an electric field through direct electromechanical coupling, while the actuation mechanism for ionic EAP devices involves the diffusion of ions, and they are hence current driven devices. Both classes have multiple family members, each having their own advantages and disadvantages.

FIGS. 1 and 2 show two possible operating modes for an EAP device.

The device comprises an electroactive polymer layer 14 sandwiched between electrodes 10, 12 on opposite sides of the electroactive polymer layer 14.

FIG. 1 shows a device which is not clamped. A voltage is used to cause the electroactive polymer layer to expand in all directions as shown.

FIG. 2 shows a device which is designed so that the expansion arises only in one direction. The device is supported by a carrier layer 16. A voltage is used to cause the electroactive polymer layer to curve or bow.

The nature of this movement for example arises from the interaction between the active layer which expands when actuated, and the passive carrier layer. To obtain the asymmetric curving around an axis as shown, molecular orientation (film stretching) may for example be applied, forcing the movement in one direction.

The expansion in one direction may result from the asymmetry in the electroactive polymer, or it may result from asymmetry in the properties of the carrier layer, or a combination of both.

In certain applications, an array of actuators can be useful, for instance in positioning systems and controlled topology surfaces. However, as the driving voltages of the actuators are fairly high it quickly becomes expensive to drive each actuator individually with its own driver IC.

A passive matrix array is a simple implementation of an array driving system using only row (n rows) and column (m columns) connections. As only (n+m) drivers are required to address up to (n×m) actuators, this is a far more cost effective approach—and also saves cost and space of additional wiring.

Ideally, in a passive matrix device, each individual actuator should be actuated up to its maximum displacement without influencing the adjacent actuators. However, in arrays of traditional EAP actuators (without any voltage threshold behavior) some cross talk to adjacent actuators will be present. When a drive voltage, for example, is applied to actuate one actuator, the actuators around it also experience a voltage and will partially actuate, which is an unwanted effect for many applications. Hence, with a passive matrix addressing scheme it is not straightforward to individually address each actuator independently of the others.

The use of an active matrix for addressing arrays of electroactive polymer actuators has been contemplated, for example for electronic braille applications. An active matrix approach involves providing a switching device at each electroactive polymer actuator, at the intersection of a row conductor and a column conductor. In this way, each actuator in the array can—if desired—be individually actuated. An active matrix addressing scheme means it is possible to have any random pattern of actuators in the array actuated at the same time.

When designing an active matrix design for a field driven EAP, a problem arises that the switching device, for example transistor, needs to be able to withstand high actuation voltages, which may be hundreds of volts. This is far above the possible voltages which can be handled by existing transistors suitable for integration into an array device.

There is therefore a particular interest in ionic (current driven) EAP devices for use with an active matrix addressing scheme. Ionic EAP devices are activated by an electrically induced transport of ions and/or solvent. They usually require low voltages but high currents, for example they may operate at low and hence safer voltages of around 5V. They require a liquid/gel electrolyte medium (although some material systems can also operate using solid electrolytes). The ability to address at lower voltages enables use of readily available switching devices.

The different types of ionic EAP device mentioned above will now be discussed in further detail.

FIG. 3 shows an example of an Ionic Polymer Metal Composites (IPMC) EAP, comprising a polymer membrane 30 between conducting electrode surfaces 32. Anions 34 are fixed in the membrane and cations 36 are mobile. The cations 36 are hydrated by water molecules 38. When a voltage is applied, the hydrated cations migrate to the cathode, leading to polymer expansion.

The IPMC actuator in this way consists of a solvent swollen ion-exchange polymer membrane laminated between two thin metal- or carbon based electrodes and requires the use of an electrolyte. Typical electrode materials are Pt, Gd, CNTs, CPs, Pd. Typical electrolytes are Li+ and Na+ water based solutions. When a field is applied and a current induced, cations typically travel to the cathode side together with water. This leads to reorganization of hydrophilic clusters and to polymer expansion. Strain in the cathode area leads to stress in the rest of the polymer matrix resulting in bending towards the anode. Reversing the applied voltage and inducing a current in the opposite direction inverts bending. Well known polymer membranes are Nafion (trade mark) and Flemion (trade mark).

FIG. 4 shows an example of a conjugated polymer actuator, comprising an electrolyte 40 sandwiched by two layers 42, 44 of the conjugated polymer. The electrolyte is used to change oxidation state. When a potential is applied to the polymer through the electrolyte, electrons are added to or removed from the polymer by the induced current, driving oxidation and reduction. Reduction results in contraction, oxidation in expansion. Thus, curvature is induced towards the reduced side 46 as shown in FIG. 4. In some cases, thin film electrodes are added when the polymer itself lacks sufficient conductivity. The electrolyte can be a liquid, a gel or a solid material (i.e. complex of high molecular weight polymers and metal salts). Most common conjugated polymers are polypyrolle (PPy), Polyaniline (PANi) and polythiophene (PTh).

FIG. 5 shows an example of a Carbon Nano Tube (CNT) actuator, in which a carbon nano tube 48 is suspended in an electrolyte 49. The electrolyte forms a double layer with the nanotubes, allowing injection of charges. This double-layer charge injection is considered as the primary mechanism in CNT actuators. The CNT acts as an electrode capacitor with charge injected on the CNT, which is then balanced by the electrical double-layer formed by movement of electrolytes to the CNT surface. Changing the charge on the carbon atoms results in changes of carbon-carbon bond length. As a result, expansion and contraction of single CNT can be observed.

Other examples include ionic polymer gels. Note that the electrodes used can be continuous, or segmented.

For low cost applications, it is desired to use low cost transistor technology, for example amorphous silicon transistors. These, as well as other low cost and low voltage technologies, typically have poorer stability, for example they suffer threshold voltage drift, which makes their usage difficult, and presents problems for the design of the driving circuitry.

SUMMARY OF THE INVENTION

It is an object of the invention to fulfill the aforementioned desire. The object is achieved with the invention as defined by the independent claims. The dependent claims provide advantageous embodiments.

According to examples in accordance with an aspect of the invention, there is provided an actuator device comprising:
an active matrix array of rows and columns of current-driven electroactive polymer actuators, each electroactive polymer actuator having a switching circuit, wherein the switching circuit comprises:
a drive transistor for driving a current through the electroactive polymer actuator; and
first and second capacitors connected in series between the gate and source or drain of the drive transistor, a data input to the switching circuit being provided to the junction between the first and second capacitors thereby to charge the second capacitor to a voltage derived from a drive voltage for the electroactive polymer actuator, and a voltage derived from the drive transistor threshold voltage being stored on the first capacitor; and
an isolation switch shared between all electroactive polymer actuators of a row, or shared between all electroactive polymer actuators of the array, between the electroactive polymer actuator and a reference terminal.

This switching circuit arrangement enables a threshold voltage to be stored on the first capacitor, and this can be done each time the actuator is operated, thereby compensating for age-related changes in the threshold voltage. Thus, a low performance (i.e. instable) transistor may be used, with measurement of the threshold voltage of the current-providing TFT once per frame time to compensate for the aging effect.

Each actuator in the array can if desired be individually actuated. In this manner it is possible to have any random pattern of actuators in the array actuated at the same time independent of the type of actuator (with or without threshold, and with or without bistability).

The switching circuit delivers a programmable current to the EAP actuator after the addressing period is completed, which can be maintained until the EAP needs to change to another state of actuation and the circuit is addressed again.

The reference terminal is for supplying a reference voltage. It can be a ground terminal.

This driving approach is particularly suitable for driving EAP devices requiring current drive at voltages below 40V. Active matrix designs with amorphous semiconductors such as amorphous silicon or IGZO type thin film transistors (TFTs) may for example be used, for cost reasons. However, other types of semiconductors can be used.

In particular, the switching circuit can overcome the threshold voltage increase of amorphous silicon TFTs, whilst also enabling programming of the switching circuit in a short time.

Each switching circuit may further comprise an input first transistor connected between an input data line and the junction between the first and second capacitors. This first transistor times the application of a data voltage to the switching circuit, for storage on the second capacitor.

Each switching circuit may further comprise a second transistor connected between the gate and drain of the drive transistor. This is used to control the supply of current from the drain (which may be connected to a power supply line) to the first capacitor. Thus, by turning on the second transistor, the first capacitor can be charged to the gate-source voltage. The second transistor may be controlled by a first gate control line which is shared between a row of switching circuits.

In one example, the first and second capacitors are connected in series between the gate and source of the drive transistor. A third transistor is then connected across the terminals of the second capacitor, controlled by a third gate control line which is shared between a row of switching circuits. The second and third gate control lines may comprise a single shared control line.

Each switching circuit may further comprise a fourth transistor connected between the drive transistor source and a ground potential line. This is used to act as a drain for current from the drive transistor, without operating the actuator, particularly during the programming sequence. The fourth transistor can also be controlled by a fourth gate control line which is shared between a row of switching circuits. The ground potential line may be shared between a row of switching circuits and comprise the fourth gate control line for the fourth transistors of an adjacent row of switching circuits.

The drive transistor preferably comprises an n-type transistor.

Examples in accordance with another aspect of the invention provide a method of driving an active matrix device comprising an array of current-driven EAP actuators each having an associated switching circuit, each switching circuit comprising a drive transistor for driving a current through the associated actuator, the method comprising, for each switching circuit:

isolating all electroactive polymer actuators of a row, or all electroactive polymer actuators of the array from a ground terminal;

driving a current through the drive transistor to ground, and charging a first capacitor to the resulting gate-source voltage;

discharging the first capacitor until the drive transistor turns off, the first capacitor thereby storing a threshold voltage;

charging a second capacitor, in series with the first capacitor between the gate and source or drain of the drive transistor, to a data input voltage;

coupling all electroactive polymer actuators of the row, or all electroactive polymer actuators of the array, to the ground terminal; and using the drive transistor to drive a current through the EAP actuator to ground using a gate voltage that is derived from the voltages across the first and second capacitors.

This method measures a drive transistor threshold voltage in each addressing sequence. During this time, the EAP actuator is isolated from ground so that no current can flow to the actuator. The method is e.g. suitable for an amorphous silicon TFT circuit, particularly with an n-type drive TFT, so that a short programming allows a large actuator array to be addressed. This can be achieved in this method via threshold voltage measurement in a pipelined addressing sequence (namely with the address sequence for adjacent rows overlapping in time) or by measuring all threshold voltages at the beginning of the frame in the blanking period.

In the pipelined address sequence, the step of charging a second capacitor is carried out by switching on an address transistor connected between a data line and an input to the switching circuit. The address transistor for each switching circuit in a row is switched on simultaneously by a common row address control line, and the address transistors for one row of switching circuits are turned on substantially immediately after the address transistors for an adjacent row are turned off.

In the blanking period sequence, the first capacitor of each switching circuit is charged to store a respective threshold voltage of the drive transistor at an initial threshold measurement period of a drive frame period, a driving period of the frame period following the threshold measurement period.

BRIEF DESCRIPTION OF THE DRAWINGS

Examples of the invention will now be described in detail with reference to the accompanying drawings, in which.

The same reference numerals are used in different figures for the same components, and description of these components will not be repeated.

DETAILED DESCRIPTION OF THE EMBODIMENTS

The invention provides an actuator device which comprises an active matrix array of rows and columns of electroactive polymer actuators, each electroactive polymer actuator having a switching circuit. The switching circuit has a drive transistor and a capacitor arrangement. The capacitor arrangement is charged to a voltage derived from a drive voltage for the electroactive polymer actuator combined with a voltage derived from the drive transistor threshold voltage. During this programming of the capacitor arrangement, the EAP actuator is isolated from any current flowing. The switching circuit enables compensation for age-related changes in the threshold voltage. Thus, a low performance (i.e. with poor threshold voltage stability) transistor may be used, with measurement of the threshold voltage of the current-providing TFT once per frame time (or once per multiple frame times) to compensate for the aging effect.

FIGS. 1 to 5 have been described in the introduction of this invention inter alia to introduce the problem area related to application to which the invention pertains and the figures form an integral part of the description to elucidate how the invention may be implemented.

The basis of the approach of the invention is that the characteristics of the TFT—and in particular its threshold voltage—define the current output, when a TFT is operated as a current source. The current output is given by:

$$I = W/L \times \mu \times (Vgs-Vt)^2$$

Where W and L are the width and length of the TFT channel, $\mu$ the mobility, Vgs the gate-source voltage and Vt the threshold.

Figure 1:
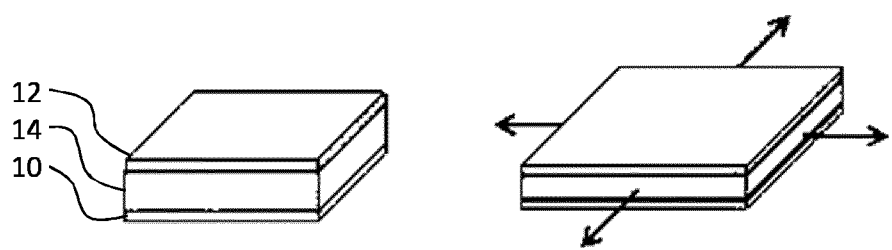
FIG. 1 shows a known electroactive polymer device which is not clamped.
Figure 2:
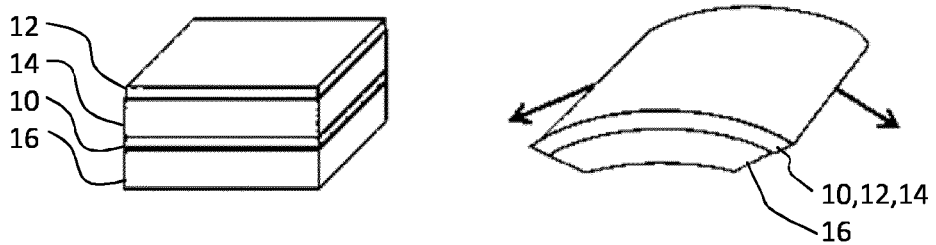
FIG. 2 shows a known electroactive polymer device which is constrained by a backing layer.
Figure 3:
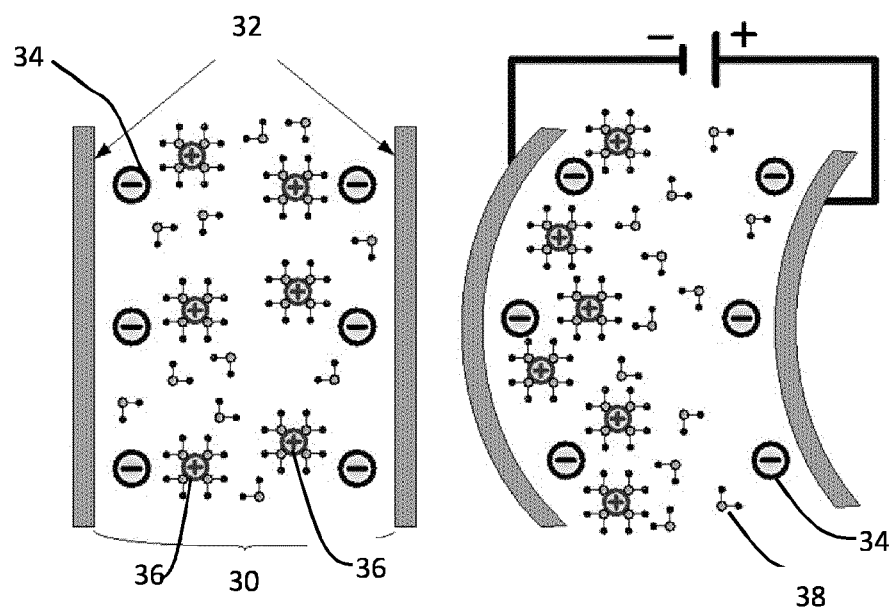
FIG. 3 shows an example of an Ionic Polymer Metal Composites (IPMC) EAP.
Figure 4:
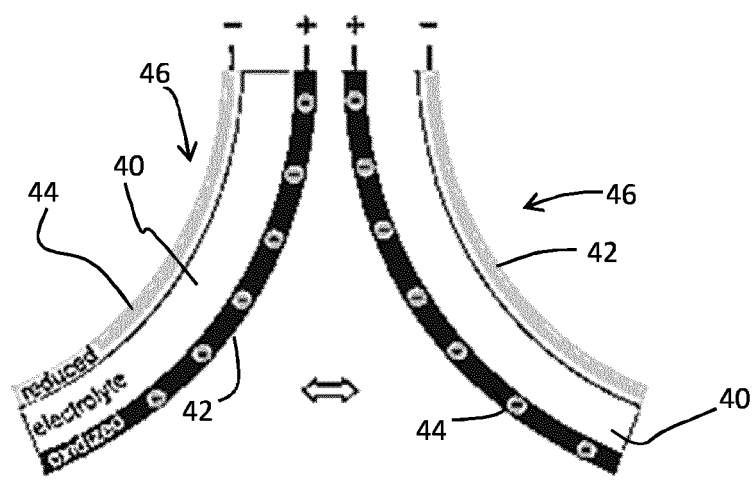
FIG. 4 shows an example of a conjugated polymer actuator.
Figure 5:
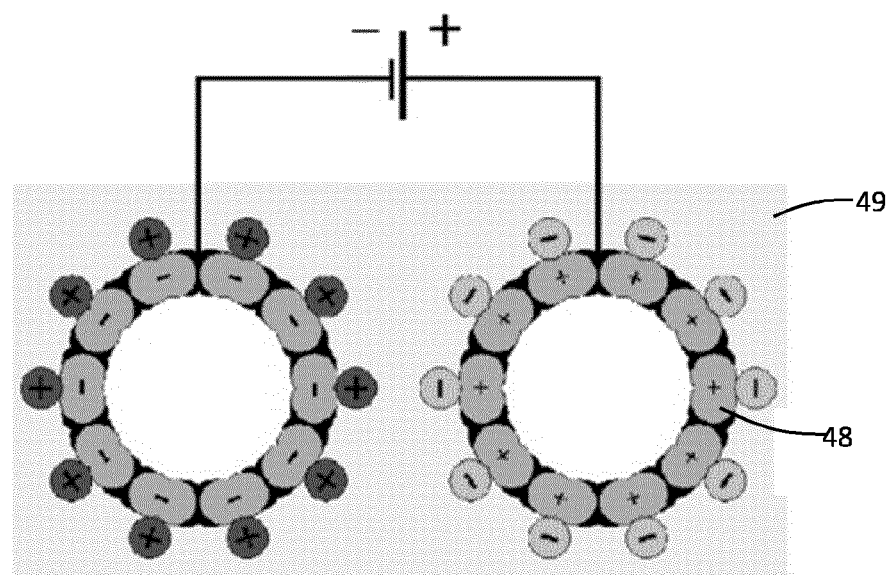
FIG. 5 shows an example of a Carbon Nano Tube (CNT) actuator.
Figure 6:
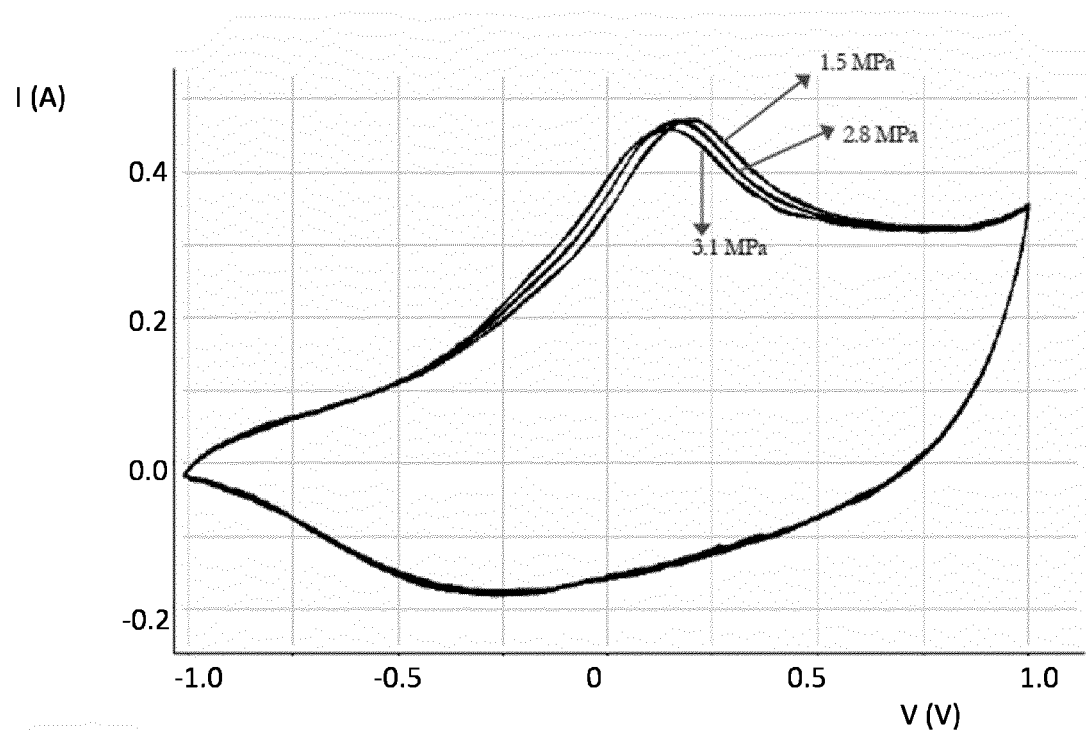
FIG. 6 shows an example of voltage-current characteristic for a conjugated polymer.

FIG. 6 shows an example of the voltage current characteristics of a conjugated polymer. It shows the current-voltage characteristics with a 5 mV/s scan rate and different applied loads for a PPy conjugated system. It represents the oxidation and reduction process (source: thesis Dynamics of conducting polymer actuators, M. Bahrami-Samani, University of Wollongong, 2007).

As a current flow is required to maintain the actuation state of the device, such devices will be driven for prolonged periods of time with considerable currents flowing through, and voltages across, the TFTs. The problem for the use of low cost low voltage thin film circuits is then stability of the threshold voltage of the TFTs. Under constant bias, the threshold voltage of the TFTs increases, therefore simple constant current circuits will cease to operate after a short time. By measuring the threshold voltage of the current-providing TFT, for example once per frame time, there is compensation for the aging effect. This allows current driven EAP active arrays in the lowest cost active matrix technology.

The current drive strength for an ionic EAP is of the order of 10 mA/cm$^2$. The array elements are for example of the order of 0.25 mm$^2$ and therefore currents of the order 25 µA are required. Amorphous silicon transistors have mobilities of around 1 cm$^2$/Vs so they can produce currents of this order with transistor widths 500 µm and with an on voltage of 7V. Therefore the use of amorphous silicon transistors is realistic.

For conjugated polymer actuators the rate of deformation of the actuator is linearly dependent on current. Thus, current driven actuators may be used to provide controlled actuation between extreme actuation levels.

Figure 7:
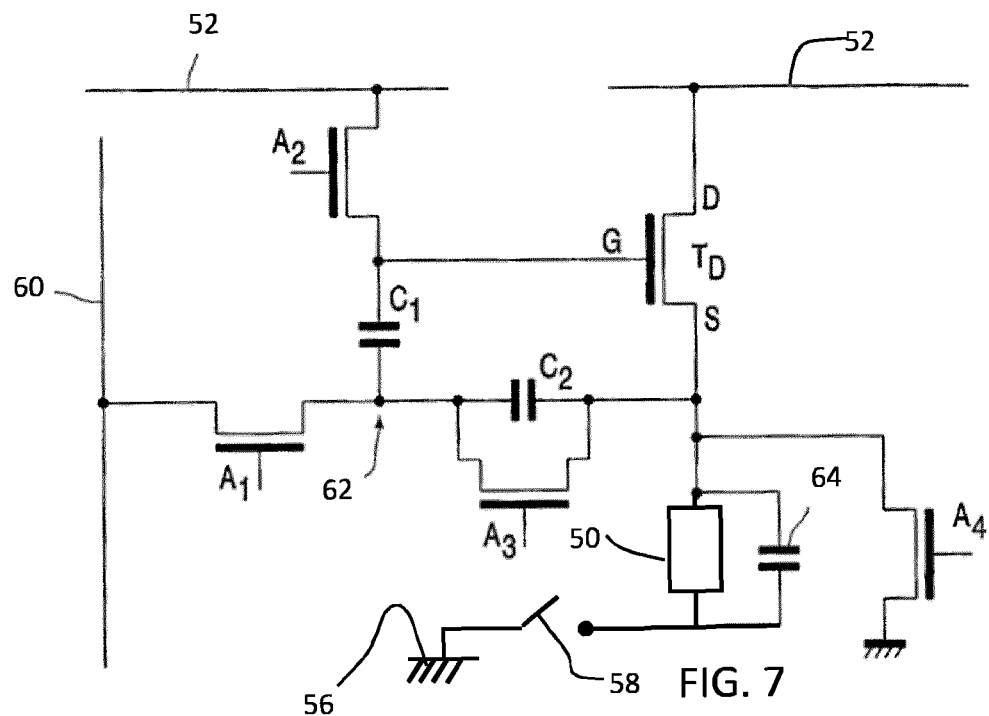
FIG. 7 shows a first switching circuit arrangement for a matrix array of EAP actuators.

FIG. 7 shows a first switching circuit arrangement in accordance with the invention.

The main part of the switching circuit topology has been proposed by the applicant for use in active matrix LED devices, for example as disclosed in WO 2004/066249. The aim in this previous proposal is to enable voltage programming of the pixel rather than current programming (e.g. using a current mirror). In this way, the very rapid programming times required for the pixelated display can be achieved. By providing compensation for variations in amorphous silicon transistor threshold voltages over time, faster voltage programming becomes possible.

This invention is based on the use of the threshold voltage compensation circuit, with adaptation to be suitable for implementing a low cost EAP active matrix array.

Each switching circuit is for an associated EAP device 50, and comprises an amorphous silicon drive transistor $T_D$ in series between a power supply line 52 and a terminal of the EAP actuator. An opposite terminal of the EAP actuator connects to ground 56 though an isolation isolation switch 58. The isolation switch enables a programing phase to be carried out without supplying current to the EAP actuator. Two separate power lines 52 are shown but they may be connected.

The circuit is an array and the isolation switch 58 is external to the array. The isolation switch is a standard silicon power switch, which is stable. A power switch of this type is provided for every row of the device, or in an alternative implementation described below, the isolation switch may be common to the whole array.

The drive transistor $T_D$ is for driving a current through the EAP device 50.

First and second capacitors $C_1$ and $C_2$ are connected in series between the gate and source of the drive transistor $T_D$. A data input to the switching circuit is provided to the junction 62 between the first and second capacitors and charges the second capacitor $C_2$ to a switching circuit data voltage as will be explained below. The first capacitor $C_1$ is for storing a drive transistor threshold voltage on the first capacitor $C_1$.

An input transistor $A_1$ is connected between an input data line 60 and the junction 62 between the first and second capacitors. This first transistor times the application of a data voltage to the switching circuit, for storage on the second capacitor $C_2$.

A second transistor $A_2$ is connected between the gate and drain of the drive transistor $T_D$. This is used to control the supply of current from the power supply line 52 to the first capacitor $C_1$. Thus, by turning on the second transistor $A_2$, the first capacitor $C_1$ can be charged to the gate-source voltage of the drive transistor $T_D$.

A third transistor $A_3$ is connected across the terminals of the second capacitor $C_2$. This is used to short out the second capacitor so that the first capacitor alone can store the gate-source voltage of the drive transistor $T_D$.

A fourth transistor $A_4$ is connected between the source of the drive transistor $T_D$ and ground. This is used to act as a drain for current from the drive transistor, without operating the EAP device, particularly during the switching circuit programming sequence.

The capacitor 64 may comprise an additional storage capacitor (as in the circuit of FIG. 2) or it may comprise the self-capacitance of the EAP device.

The transistors $A_1$ to $A_4$ are controlled by respective row conductors which connect to their gates. As will be explained further below, some of the row conductors may be shared. The addressing of an array of switching circuits thus involves addressing rows of switching circuits in turn, and the data line 60 comprises a column conductor, so that a full row of switching circuits is addressed simultaneously, with rows being addressed in turn, in conventional manner.

The circuit of FIG. 7 can be operated in a number of different ways.

The basic operation will first be described, and the way this can be extended to provide even more pipelined addressing is then explained. Pipelined addressing means there is some timing overlap between the control signals of adjacent rows.

Figure 8:
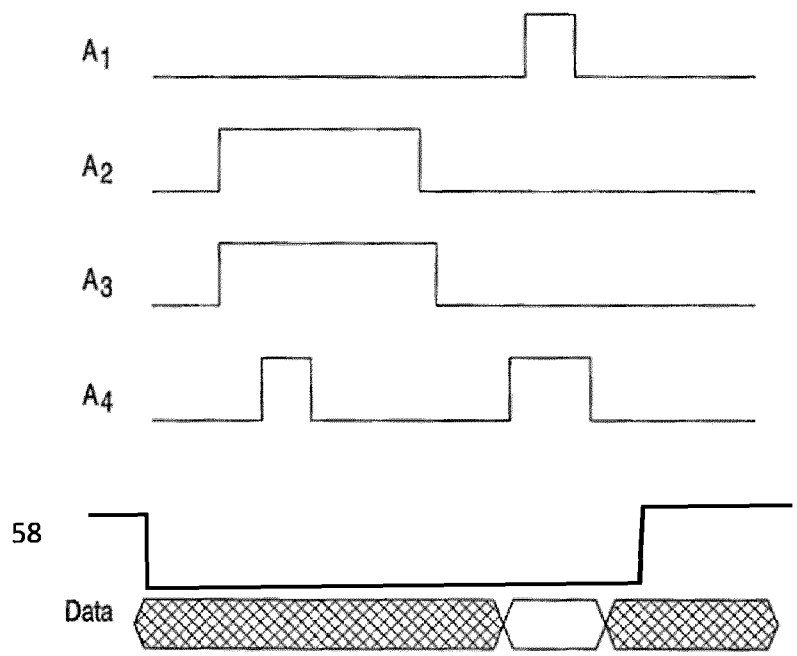
FIG. 8 shows a first timing diagram for the operation of the circuit of FIG. 7.

Only the drive transistor $T_D$ is used in constant current mode. All other TFTs $A_1$ to $A_4$ in the circuit are used as switches that operate on a short duty cycle. Therefore, the threshold voltage drift in these devices is small and does not affect the circuit performance. The timing diagram is shown in FIG. 8.

The plots $A_1$ to $A_4$ represent the gate voltages applied to the respective transistors. Plot "58" represents the voltage applied to the isolation switch 58, and the clear part of the plot "DATA" represents the timing of the data signal on the data line 60. The hatched area represents the time when data is not present on the data line 60. It will become apparent from the description below that data for other rows of switching circuits can be applied during this time so that data is almost continuously applied to the data line 60, giving a pipelined operation.

The circuit operation is to store the threshold voltage of the drive transistor $T_D$ on $C_1$, and then store the data voltage on $C_2$ so that the gate-source of $T_D$ is the data voltage plus the threshold voltage.

The circuit operation comprises the following steps.

The isolation switch 58 for the switching circuits in one row of the array is open to prevent current flow through the EAP actuators in that row. This is the negative pulse in the plot "58" in FIG. 8.

Address lines $A_2$ and $A_3$ go high to turn on the relevant TFTs. This shorts out capacitor $C_2$ and connects one side of capacitor $C_1$ to the power line and the other to the EAP device.

Address line $A_4$ then goes high to turn on its TFT. This brings the anode of the LED to ground and creates a large gate-source voltage on the drive TFT TD. In this way $C_1$ is charged, but not $C_2$ as this remains short circuited.

Address line A4 then goes low to turn off the respective TFT and the drive TFT discharges capacitor $C_1$ until it reaches its threshold voltage. In this way, the threshold voltage of the drive transistor $T_D$ is stored on $C_1$.

Again, there is no voltage on the second capacitor $C_2$.

A2 is brought low to isolate the measured threshold voltage on the first capacitor $C_1$, and $A_3$ is brought low so that the second capacitor $C_2$ is no longer short-circuited.

$A_4$ is then brought high again to connect the anode to ground. The data voltage is then applied to the second capacitor $C_2$ whilst the input transistor is turned on by the high pulse on $A_1$.

Finally, $A_4$ goes low followed by the isolation switch being activated so that the EAP device receives the required current.

The addressing sequence can be pipelined so that more than one row of switching circuits can be programmed at any one time. Thus, the addressing signals on lines $A_2$ to $A_4$ and the row wise isolation switch 50 can overlap with the same signals for different rows. Thus, the length of the addressing sequence does not imply long programming times, and the effective line time is only limited by the time required to charge the second capacitor $C_2$ when the address line $A_1$ is high. This time period is the same as for a standard active matrix addressing sequence. The other parts of the addressing mean that the overall frame time will only be lengthened slightly by the set-up required for the first few rows of the array. However this set can easily be done within the frame-blanking period so the time required for the threshold voltage measurement is not a problem.

Figure 9:
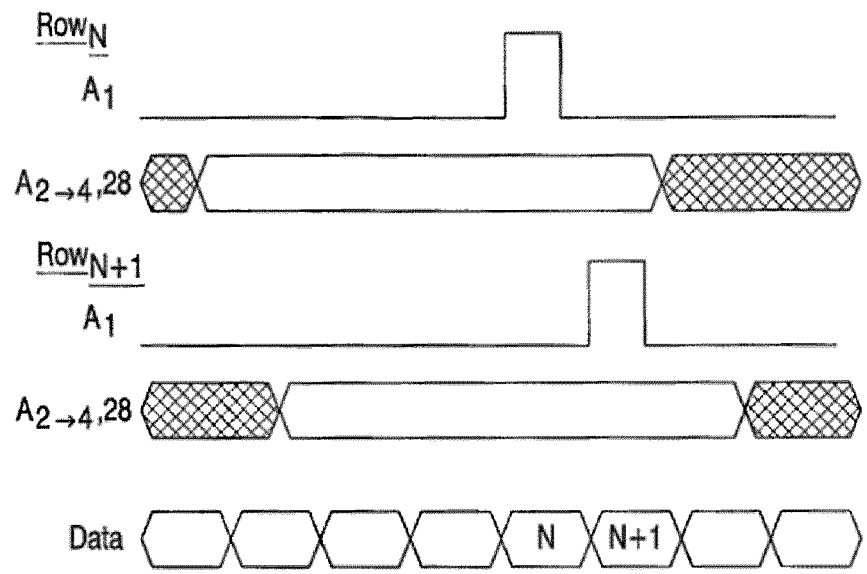
FIG. 9 shows a second timing diagram for the operation of the circuit of FIG. 7 using pipelined addressing.

Pipelined addressing is shown in the timing diagram of FIG. 9. The control signals for the transistors $A_2$ to $A_4$ have been combined into a single plot, but the operation is as described with reference to FIG. 8. The "Data" plot in FIG. 9 shows that the data line 60 is used almost continuously to provide data to successive rows.

In the method of FIGS. 8 and 9, the threshold measurement operation is combined with the EAP actuation, so that the threshold measurement and EAP actuation is performed for each row of switching circuits in turn.

Figure 10:
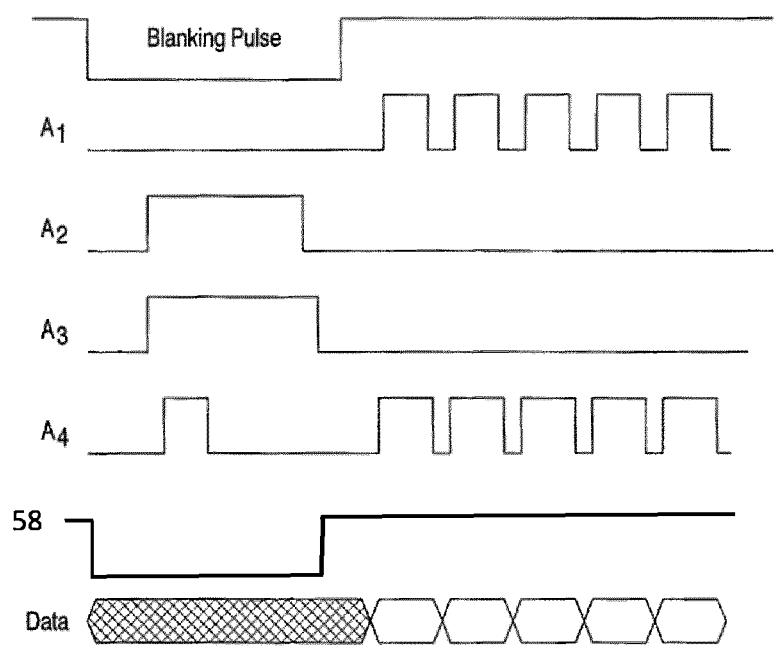
FIG. 10 shows timing diagrams for a method in which the threshold voltages are measured at the beginning of the frame for all switching circuits in the device.

FIG. 10 shows timing diagrams for a method in which the threshold voltages are measured at the beginning of the frame for all switching circuits in the device. The plots in FIG. 10 correspond to those in FIG. 8. The advantage of this approach is that only one power switch for the whole array is needed (instead of different switches for different rows, as required to implement the method of FIGS. 8 and 9). The disadvantage is that leakage currents may result in some actuation non-uniformity.

The circuit diagram for this method is still FIG. 7 except there is now only one power switch when considering the whole array. The timing diagram is however different. In effect, all of the EAP devices are combined together on the low voltage side (rather than just common on a row by row basis of FIG. 7).

As shown in FIG. 10, the signals $A_2$, $A_3$, $A_4$ and the isolation switch signal are supplied to all EAP devices in the array in a blanking period to perform the threshold voltage measurement. Signal $A_4$ is supplied to every switching circuit simultaneously in the blanking period, so that all the signals $A_2$ to $A_4$ are supplied to all rows at the same time. During this time, no data can be provided to the switching circuits, hence the shaded portion of the data plot at the base of FIG. 10.

In the subsequent addressing period, data is supplied separately to each row in turn, as is signal $A_1$. The sequence of pulses on $A_1$ in FIG. 10 represent pulses for consecutive rows, and each pulse is timed with the application of data to the data lines 60.

The circuit in FIG. 7 has a large number of rows, for the control of the transistors and for the isolation switches.

Figure 11:
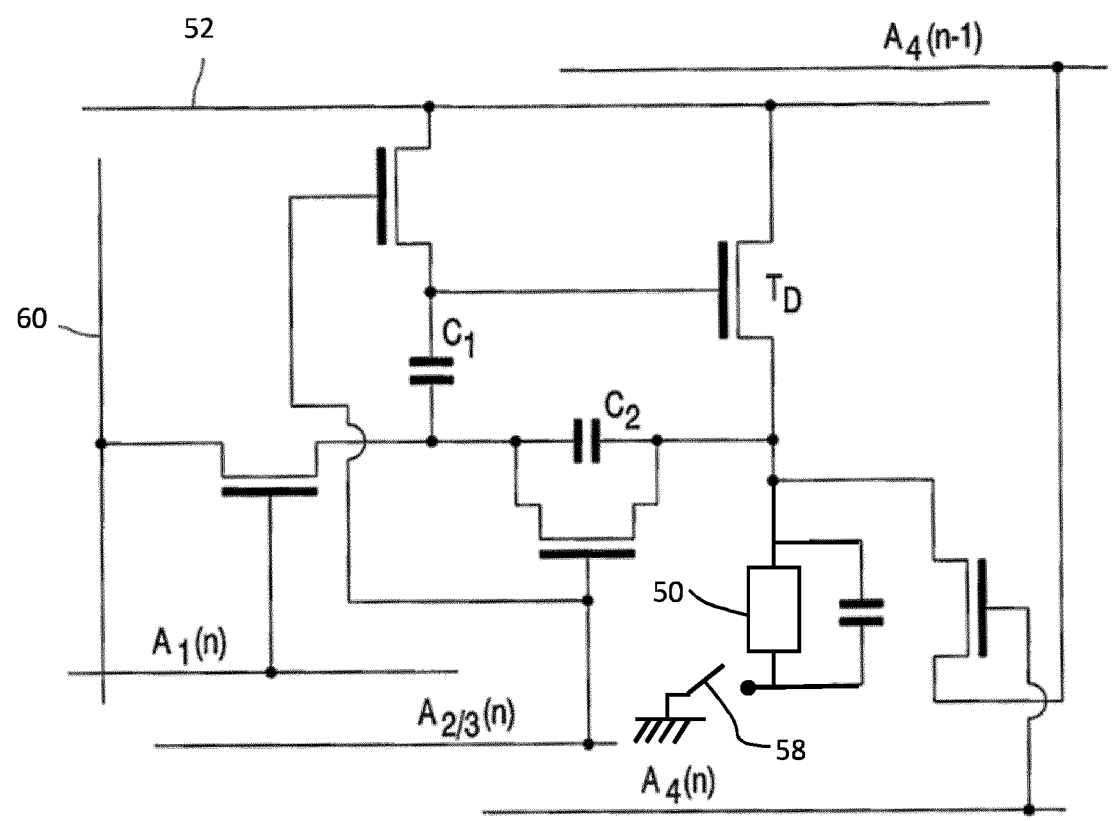
FIG. 11 shows a circuit modification which reduces the number of rows required.

FIG. 11 shows a circuit modification which reduces the number of rows required. The timing diagrams described above show that signals $A_2$ and $A_3$ are very similar. Simulations show that $A_2$ and $A_3$ can in fact be made the same so that only one address line is required. A further reduction can be made by connecting the ground line associated with the transistor $A_4$ in FIG. 7 to the address line $A_4$ in a previous row. The circuit in FIG. 11 shows the address lines $A_4$ for row n and row n−1.

The EAP layer within the device is typically sandwiched between electrodes. The electrodes may be stretchable so that they follow the deformation of the EAP material layer. Materials suitable for the electrodes are also known, and may for example be selected from the group consisting of thin metal films, such as gold, copper, or aluminum or organic conductors such as carbon black, carbon nanotubes, graphene, poly-aniline (PANI), poly(3,4-ethylenedioxythiophene) (PEDOT), e.g. poly(3,4-ethylenedioxythiophene) poly(styrenesulfonate) (PEDOT:PSS). Metalized polyester films may also be used, such as metalized polyethylene terephthalate (PET), for example using an aluminum coating.

The materials for the different layers will be selected for example taking account of the elastic moduli (Young's moduli) of the different layers.

Additional layers to those discussed above may be used to adapt the electrical or mechanical behavior of the device, such as additional polymer layers.

If the plated electrodes used within the device are arranged in a non-symmetric configuration, the physical change can induce all kinds of deformations such as twisting, rolling, torsioning, turning, and non-symmetric bending deformation.

The invention can be applied in many EAP applications where a matrix array of actuators is of interest.

In many applications the main function of the product relies on the (local) manipulation of human tissue, or the actuation of tissue contacting interfaces. In such applications EAP actuators provide unique benefits mainly because of the small form factor, the flexibility and the high energy density. Hence EAP's can be easily integrated in soft, 3D-shaped and/or miniature products and interfaces. Examples of such applications are:

Skin cosmetic treatments such as skin actuation devices in the form of EAP-based skin patches which apply a constant or cyclic stretch to the skin in order to tension the skin or to reduce wrinkles;

Respiratory devices with a patient interface mask which has an EAP-based active cushion or seal, to provide an alternating normal pressure to the skin which reduces or prevents facial red marks;

Electric shavers with an adaptive shaving head. The height of the skin contacting surfaces can be adjusted using EAP actuators in order to influence the balance between closeness and irritation;

Oral cleaning devices such as an air floss with a dynamic nozzle actuator to improve the reach of the spray, especially in the spaces between the teeth. Alternatively, toothbrushes may be provided with activated tufts;

Consumer electronics devices or touch panels which provide local haptic feedback via an array of EAP transducers which is integrated in or near the user interface;

Catheters with a steerable tip to enable easy navigation in tortuous blood vessels.

Another category of relevant application which benefits from EAP actuators relates to the modification of light. Optical elements such as lenses, reflective surfaces, gratings etc. can be made adaptive by shape or position adaptation using EAP actuators. Here the benefits of EAP actuators are for example the lower power consumption.

Other circuit options are shown in WO 2004/066249, for example with first and second capacitors connected in series between the gate and drain of the drive transistor, and the junction between them connected to the source through a further transistor. Reference is made to WO 2004/066249 for further details. These other circuit options may also be employed. Thus, circuit options are also possible in which it is the gate-drain voltage stored across a capacitor arrangement rather than a gate-source voltage.

The invention has been described above as implemented with amorphous silicon thin film transistors. There are other technologies that may be used, such as indium gallium zinc oxide (IGZO) semiconductor devices as described in for example Nature. 432: 488-492.

IGZO's advantage over zinc oxide is that it can be deposited as a uniform amorphous phase while retaining the high carrier mobility common to oxide semiconductors. IGZO-TFT has 20-50 times the electron mobility of amorphous silicon, which has often been used in liquid-crystal displays (LCDs) and e-papers. Yet other amorphous semiconductors or, in fact, any semiconductors that suffer from instabilities can benefit from the use of the invention.

The most widely used technique for Transparent Conducting Oxide (TCO) synthesis is Pulsed Laser Deposition (PLD) In PLD, a laser is used to focus on nano-sized spots on solid elemental targets. Laser pulse frequencies are varied between the targets in ratios to control the composition of the film. IGZO can be deposited onto substrates such as quartz, single-crystal silicon, or even plastic due to its ability for low-temperature deposition. The substrates are placed in a PLD vacuum chamber, which controls oxygen pressure in order to ensure favorable electrical properties. After synthesis, the film is annealed, or gradually exposed to air to adjust to the atmosphere.

The EAP actuators are slow to respond. Thus, a drive scheme may involve programming and driving the switching circuits, then pausing. This will slow down the ageing of the drive transistor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

In summary, the invention is about an actuator device comprises an active matrix array of rows and columns of electroactive polymer actuators, each electroactive polymer actuator having a switching circuit. The switching circuit has a drive transistor and a capacitor arrangement. The capacitor arrangement is charged to a voltage derived from a drive voltage for the electroactive polymer actuator combined with a voltage derived from the drive transistor threshold voltage. During this programming of the capacitor arrangement, the EAP actuator is isolated from any current flowing. The switching circuit enables compensation for age-related changes in the threshold voltage. Thus, a low performance (i.e. with poor threshold voltage stability) transistor may be used, with measurement of the threshold voltage of the current-providing TFT once per frame time (or once per multiple frame times) to compensate for the aging effect.

The invention claimed is:

1. An actuator device comprising:
an active matrix array comprising a plurality of rows and a plurality of columns,
wherein each intersection of one of the plurality of rows and one of the plurality of columns comprises at least one electroactive polymer actuator,
wherein each electroactive polymer actuator comprises a switching circuit,
wherein each of the switching circuits comprises a drive transistor, a first capacitor and a second capacitor,
wherein the drive transistor comprises a gate, a source and a drain,
wherein the drive transistor is arranged to drive a current through the electroactive polymer actuator, and
wherein the first capacitor and the second capacitor are connected in series between the gate and the source,
a data input to each of the switching circuit, wherein the data input is electrically connected to a junction,
wherein the junction is an electrical connection between the first capacitor and the second capacitor, and
wherein the second capacitor is arranged to charge to a voltage derived from a drive voltage for the electroactive polymer actuator and
a voltage derived from a drive transistor threshold voltage stored on the first capacitor; and
an isolation switch electrically connected between all of the electroactive polymer actuators of a row and a reference terminal.

2. The device as claimed in claim 1, wherein the drive transistor is an amorphous semiconductor transistor.

3. The device as claimed in claim 1, wherein the electroactive polymer actuators are selected from the group consisting of conjugated polymer actuators, carbon nanotube polymer composite actuators or ionic polymer metal composite actuators.

4. The device as claimed in claim 1, wherein each of the switching circuits comprises an input first transistor connected between an input data line and the junction.

5. The device as claimed in claim 1, wherein each of the switching circuits comprises:
a second transistor, wherein the second transistor is connected between the gate and the drain of the drive transistor of the switching circuit; and
a third transistor,
wherein the second capacitor has a first terminal and a second terminal, and
wherein the third transistor is connected between the first terminal and the second terminal.

6. The device as claimed in claim 5,
wherein the second transistor is controlled by a second gate control line and the third transistor is controlled by a third gate control line, and
wherein the second gate control line and the thrid gate control line are shared between a row of switching circuits.

7. The device as claimed in claim 6,
wherein the second gate control line, and the third gate control line comprise a single shared control line.

8. The device as claimed in claim 1, wherein the first capacitor and the second capacitor are connected in series between the gate and the source.

9. The device as claimed in claim 1,
wherein each of the switching circuits comprises a fourth transistor, and
wherein the fourth transistor is connected between the source of the drive transistor and a ground potential line.

10. The device as claimed in claim 9,
wherein the fourth transistor is controlled by a fourth gate control line, and
wherein the fourth gate control line is shared between a row of switching circuits.

11. The device as claimed in claim 1, wherein the drive transistor comprises an n-type transistor.

12. The device as claimed in claim 1, wherein the isolation switch is electrically connected between all of the electroactive polymer actuators of the active matrix array and a reference terminal.

13. A method of driving an active matrix device, wherein the active matrix device comprises an array of electroactive polymer actuators, wherein the active matrix comprises a plurality of rows and a plurality of columns, wherein each of the electroactive polymer actuators has having an associated switching circuit, wherein each switching circuit comprises a drive transistor, and wherein each drive transistor is arranged to drive a current through the associated electroactive polymer actuator, the method comprising, for each switching circuit, and wherein all of the all electroactive polymer actuators of the array are isolated from a ground terminal:
driving a current through the drive transistor to ground, and charging a first capacitor to a gate-source voltage of the drive transistor, wherein the drive transistor comprises a gate, a source and a drain;
discharging the first capacitor until the drive transistor turns off, wherein the first capacitor stores a threshold voltage;
charging a second capacitor to a data input voltage, wherein the second capacitor is in series with the first capacitor, and wherein the series connection of the first capacitor and the second capacitor is between the gate and the source of the drive transistor;
coupling all of the electroactive polymer actuators of each row to the ground terminal; and
using the drive transistor to drive a current through the electroactive polymer actuator to ground using a gate voltage that is derived from the voltages across the first capacitor and the second capacitor.

14. The method as claimed in claim 13, wherein the charging a second capacitor is carried out by switching on an address transistor connected between a data line and an input to the switching circuit.

15. The method as claimed in claim 14,
wherein the address transistor for each switching circuit in a row is switched on simultaneously by a common row address control line, and
wherein the address transistors for one row of the switching circuits are turned on substantially immediately after the address transistors for an adjacent row are turned off.

16. The method as claimed in claim 13,
wherein the first capacitor of each switching circuit is charged to store a respective threshold voltage of the drive transistor of the switching circuit at an initial threshold measurement period of an actuation frame period, and
wherein a switching circuit driving period of the actuation frame period follows the initial threshold measurement period.

17. The method as claimed in claim 13, further comprising coupling all of the electroactive polymer actuators of the array to the ground terminal.

18. An actuator device comprising:
an active matrix array comprising a plurality of rows and a plurality of columns,
wherein each intersection of one of the plurality of rows and one of the plurality of columns comprises at least one electroactive polymer actuator,
wherein each electroactive polymer actuator comprises a switching circuit,
wherein each of the switching circuits comprises a drive transistor, a first capacitor and a second capacitor,
wherein the drive transistor comprises a gate, a source and a drain,
wherein the drive transistor is arranged to drive a current through the electroactive polymer actuator, and
wherein the first capacitor and the second capacitor are connected in series between the gate and the drain,
a data input to each of the switching circuit, wherein the data input is electrically connected to a junction,
wherein the junction is an electrical connection between the first capacitor and the second capacitor, and
wherein the second capacitor is arranged to charge to a voltage derived from a drive voltage for the electroactive polymer actuator and
a voltage derived from a drive transistor threshold voltage stored on the first capacitor; and
an isolation switch electrically connected between all of the electroactive polymer actuators of the active matrix array and a reference terminal.

* * * * *